C. E. LAING.
MIXING CUP FOR CENTRIFUGAL MIXERS.
APPLICATION FILED JULY 7, 1919.
1,322,492.
Patented Nov. 18, 1919.
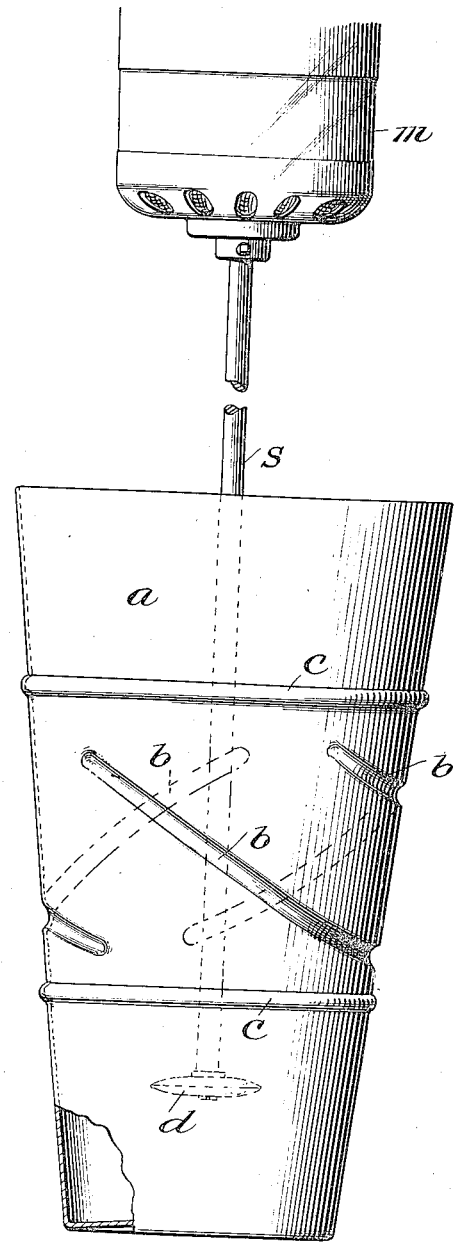
Inventor.
Charles E. Laing.
by
his Attorney.

UNITED STATES PATENT OFFICE.

CHARLES E. LAING, OF PORTLAND, OREGON.

MIXING-CUP FOR CENTRIFUGAL MIXERS.

1,322,492.

Specification of Letters Patent. Patented Nov. 18, 1919.

Application filed July 7, 1919. Serial No. 309,079.

*To all whom it may concern:*

Be it known that I, CHARLES E. LAING, a citizen of the United States, and a resident of Portland, county of Multnomah, State of Oregon, have invented a new and useful Improvement in Mixing-Cups for Centrifugal Mixers, of which the following is a specification.

To those familiar with mixing soda fountain beverages, it is well known that the lightness, or fluffiness of a drink is largely due to aeration; and therefore it is desirable to promote such aeration, since it increases the attractive appearance and palatableness of the drink.

As also well known, soda fountain beverages are usually mixed in the present day, by a revolving mixer, driven by a motor at high speed.

I have discovered that a lighter, more fluffy and creamy mass of liquid can be produced in the upper part of the mixing cup, and the whole product be made to taste richer, by inducing a better aeration of the liquid.

By observing the operation of a centrifugal mixer it will be seen that the liquid is lifted, by the developed centrifugal force, along the sides of the cup, causing an inverted cone-like depression in the liquid, the vertex of the cone being located about the disk carried by the revolving spindle of the mixer.

The higher the wall of liquid is lifted on the sides of the mixing cup, the greater and thinner will be the area of the surface of the liquid exposed to the air, and proportionately greater will also be the process of aerating such surface. The agitation of the liquid only in part performs the function of aeration. The exposing of a large and thin surface of the liquid to the air is the main factor.

I have further discovered that the lifting of the wall of liquid to a greater height on the wall of the mixing cup may be accomplished by providing ribs on the interior surface of the mixing cup, provided such ribs be given the proper inclination, and proper form in cross-section, so that the mixing cup will offer only negligible resistance to the mass of liquid revolving in it, hence not take on the revolving motion of the liquid, but remain stationary; for since the mixing cup is not held, but merely placed under the mixer, therefore if offering any appreciable resistance to the rotary motion of the mass of liquid revolving in it, it would soon acquire such rotary motion itself, and spin with the revolving spindle of the mixer, instead of remaining stationary, and permitting the spindle of the mixer to revolve within it.

I have further discovered that in order to obtain the effects and results described, it is necessary that the ribs be made of substantially convex cross-section, and that they have an inclination upward at an angle of about 30° from the horizontal, in the same direction in which the spindle of the mixer revolves.

I attain said result by making my cup as illustrated in the accompanying drawing, in which the figure shows a side elevation of my improved mixing cup, and illustrates its practical use.

The body *a* of the cup may be made of any suitable shape. In its sides are pressed, or otherwise formed, a plurality of spiral ribs *b*, preferably having their extremities overlapping. Said spiral ribs are of convex cross-section, and rise at an angle of about 30° from the horizontal in the same direction in which the spindle of the centrifugal mixer rotates.

The beverage is assumed to be mixed by inserting in the cup one of the commercial centrifugal mixers, consisting, for example of a spindle *s*, driven by a motor *m*, and carrying a disk *d*.

The centrifugal force developed in the liquid by the rotation of the disk *d* tends to cause the liquid to climp up on the sides of the cup leaving a hollow inverted cone of air, the vertex of which is located about said disk. The upward incline of the ribs *b*, provided in my improved mixing cup, promotes the climping of the liquid on the sides of the mixing cup to an appreciable degree, tending to carry it to a much greater height than in a mixing cup having plain sides. In short the ribs tend to deflect in part the rotary motion of the liquid into a rising motion, in so doing producing a thinner wall of liquid of greater surface exposed to the air, and proportionately increasing the aeration of the liquid; also tending to break up the larger globules of air and form smaller ones only, due to the thinness of the wall of liquid, and giving to the resulting mixture a richer taste; it being well known that the difference between a flat tasting liquid and a rich, cream-like liquid is largely the lack of sufficient aeration in one instance, and efficient aeration in other.

The extremities of the spiral ribs are preferably overlapped so as to obtain a more continuous lifting effect.

The term cup is to be understood as including any vessel or container.

The ribs $c$ are provided for measuring the quantities of liquids.

I claim:

1. A mixing-cup for centrifugal mixer provided on the inner surface of its sides with a plurality of ribs of approximately convex cross-section and inclined upwardly at an angle of about 30° from the horizontal in the same direction as that in which the spindle of the centrifugal mixer rotates, thereby diverting in part the rotary motion of the liquid into a lifting motion, and causing a greater and thinner surface of the liquid to be exposed to the air within the mixing cup.

2. A mixing-cup for centrifugal mixer provided on the inner surface of its sides with a plurality of ribs of approximately convex cross-section and inclined upwardly at an angle of about 30° from the horizontal in the same direction as that in which the spindle of the centrifugal mixer rotates, thereby diverting in part the rotary motion of the liquid into a lifting motion, and causing a greater and thinner surface of the liquid to be exposed to the air within the mixing cup, the extremities of the said ribs overlapping each other for the purpose described.

CHARLES E. LAING.